US010097627B1

(12) United States Patent
Gafton et al.

(10) Patent No.: US 10,097,627 B1
(45) Date of Patent: Oct. 9, 2018

(54) COMPUTER RESOURCE ALLOCATION

(71) Applicant: AMAZON TECHNOLOGIES, INC., Seattle, WA (US)

(72) Inventors: Cristian Gabriel Gafton, Palo Alto, CA (US); Jacob Adam Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 14/741,244

(22) Filed: Jun. 16, 2015

(51) Int. Cl.
  *G06F 15/173* (2006.01)
  *H04L 29/08* (2006.01)
  *H04L 12/911* (2013.01)
  *G06F 9/455* (2018.01)

(52) U.S. Cl.
  CPC ...... *H04L 67/1004* (2013.01); *G06F 9/45533* (2013.01); *H04L 47/70* (2013.01)

(58) Field of Classification Search
  CPC .. H04L 67/1004; H04L 47/70; G06F 9/45533
  See application file for complete search history.

(56) References Cited

U.S. PATENT DOCUMENTS

| 9,389,903 | B2 * | 7/2016 | Zhong | G06F 9/5077 |
|---|---|---|---|---|
| 2010/0333089 | A1 * | 12/2010 | Talwar | G06F 11/004 |
| | | | | 718/1 |
| 2013/0080641 | A1 * | 3/2013 | Lui | H04L 67/10 |
| | | | | 709/226 |
| 2014/0032761 | A1 * | 1/2014 | Beveridge | G06F 9/5011 |
| | | | | 709/226 |
| 2014/0068077 | A1 * | 3/2014 | Hadad | G06F 9/5027 |
| | | | | 709/226 |
| 2014/0095826 | A1 * | 4/2014 | Rajagopal | G06F 3/0605 |
| | | | | 711/170 |
| 2015/0039764 | A1 * | 2/2015 | Beloglazov | H04L 47/70 |
| | | | | 709/226 |
| 2015/0113529 | A1 * | 4/2015 | Zhong | G06F 9/5077 |
| | | | | 718/1 |
| 2015/0234674 | A1 * | 8/2015 | Zhong | G06F 9/45558 |
| | | | | 718/1 |
| 2015/0309828 | A1 * | 10/2015 | Shaik | G06F 9/45558 |
| | | | | 718/1 |
| 2015/0334696 | A1 * | 11/2015 | Gu | H04L 67/1095 |
| | | | | 718/1 |
| 2015/0378765 | A1 * | 12/2015 | Singh | G06F 9/45558 |
| | | | | 718/1 |
| 2016/0299772 | A1 * | 10/2016 | Seenappa | G06F 9/45558 |
| 2016/0357589 | A1 * | 12/2016 | Singh | G06F 9/45558 |
| 2017/0031622 | A1 * | 2/2017 | Nagarajan | G06F 3/0631 |

\* cited by examiner

*Primary Examiner* — Mohamed A Wasel
(74) *Attorney, Agent, or Firm* — Davis Wright Tremaine LLP

(57) ABSTRACT

Various systems, processes, and techniques may be used to allocate computer resources. In particular implementations, systems and processes for allocation of computer resources may include the ability to determine whether a request for allocation of computer resources has been received and determine a set of server computers able to fulfill requirements of the request. The systems and processes may also include the ability to identify one or more server computers in the set likely to successfully provide the computer resources and allocate the requested computer resources on an identified server computer.

26 Claims, 8 Drawing Sheets

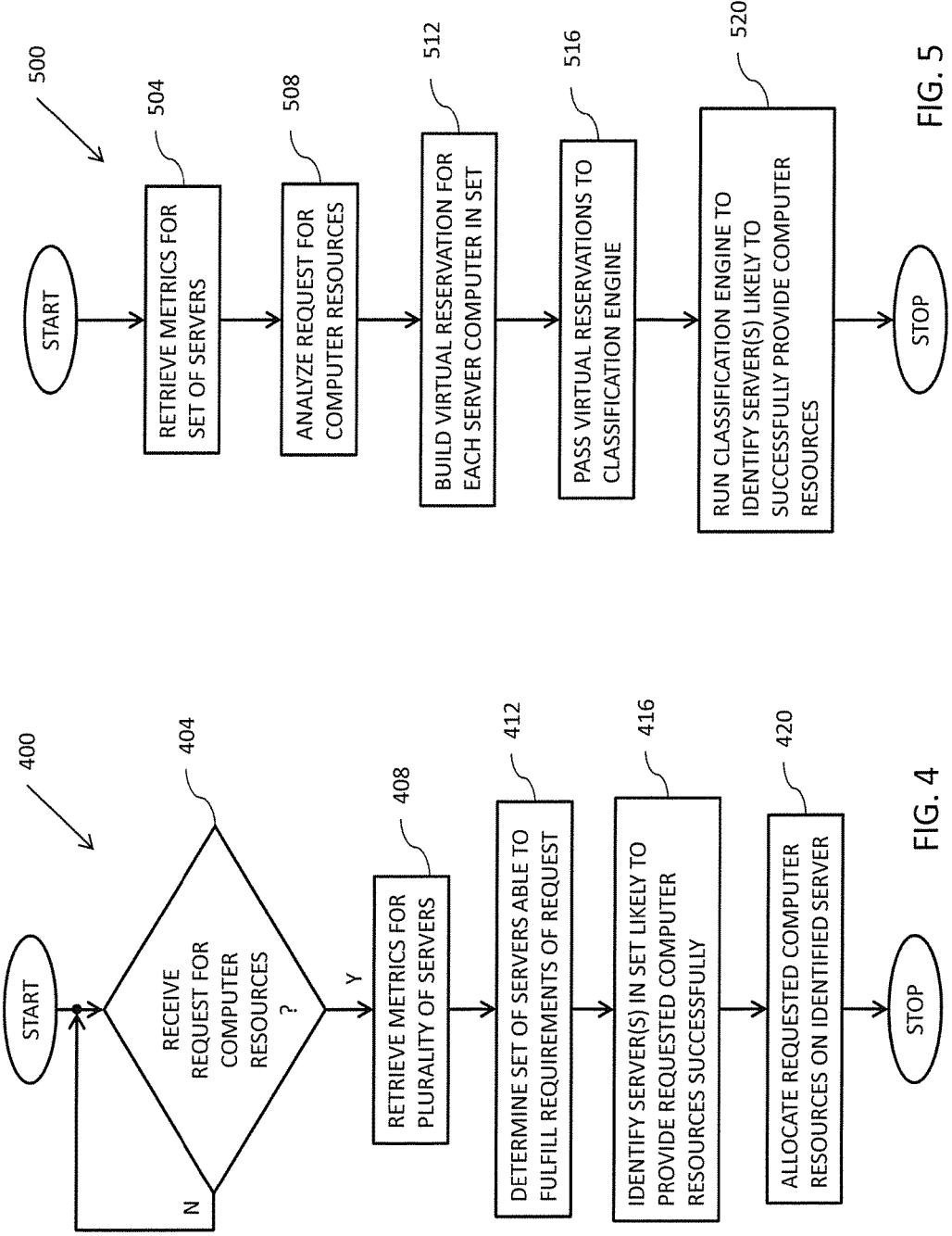

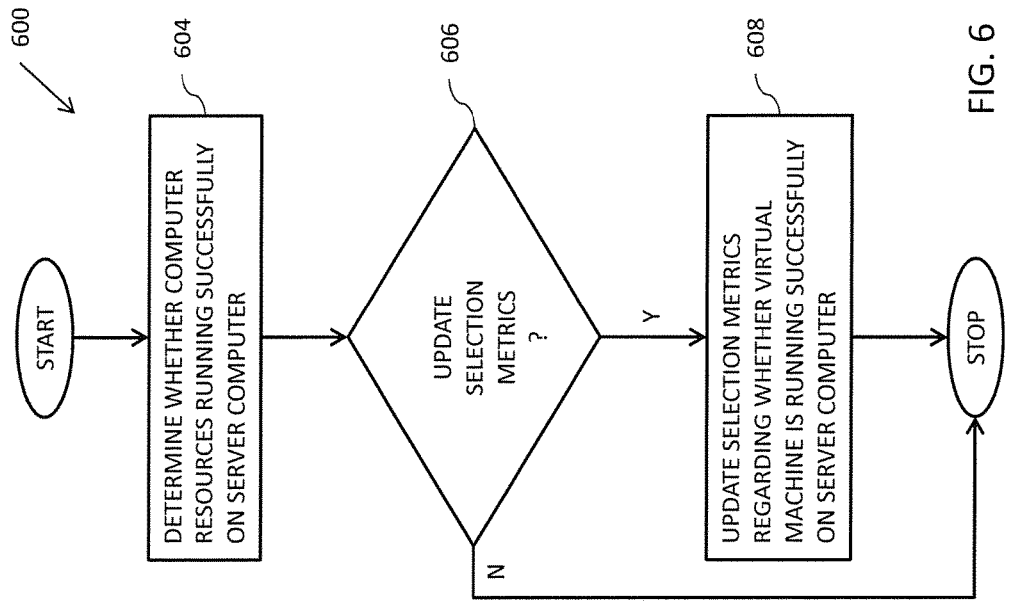

COMPUTER RESOURCE ALLOCATION

BACKGROUND

Some network-based computing service providers allow customers to purchase and utilize computer resources, such as virtual machine instances, on a permanent or as-needed basis. In addition to virtual machine instances, such computing service providers typically allow customers to purchase and utilize other types of computer resources. For example, customers might be permitted to purchase access to and use file and block data storage resources, database resources, networking resources, and other types of computer resources. Utilizing these computer resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

When requesting certain types of computer resources, such as virtual machine instances, customers of service provider networks such as those described above are typically able to specify some generic details about the actual hardware and software platform (which might be also be referred to herein as an "infrastructure platform") that is allocated to provide the computer resources. For example, in the case of virtual machine instances, a customer might be permitted to specify the desired amount of memory, the desired level of processing capability, and a desired amount of storage. The network-based computing service then selects a particular hardware platform, such as a particular server computer, to utilize to instantiate the virtual machine requested by the customer.

BRIEF DESCRIPTION OF THE DRAWINGS

FIG. 4 is a flow diagram illustrating an example process for computer resource allocation.

FIG. 5 is a flow diagram illustrating another example process for computer resource allocation.

FIG. 6 is a flow diagram illustrating an additional example process for computer resource allocation.

DETAILED DESCRIPTION

Figure 1:
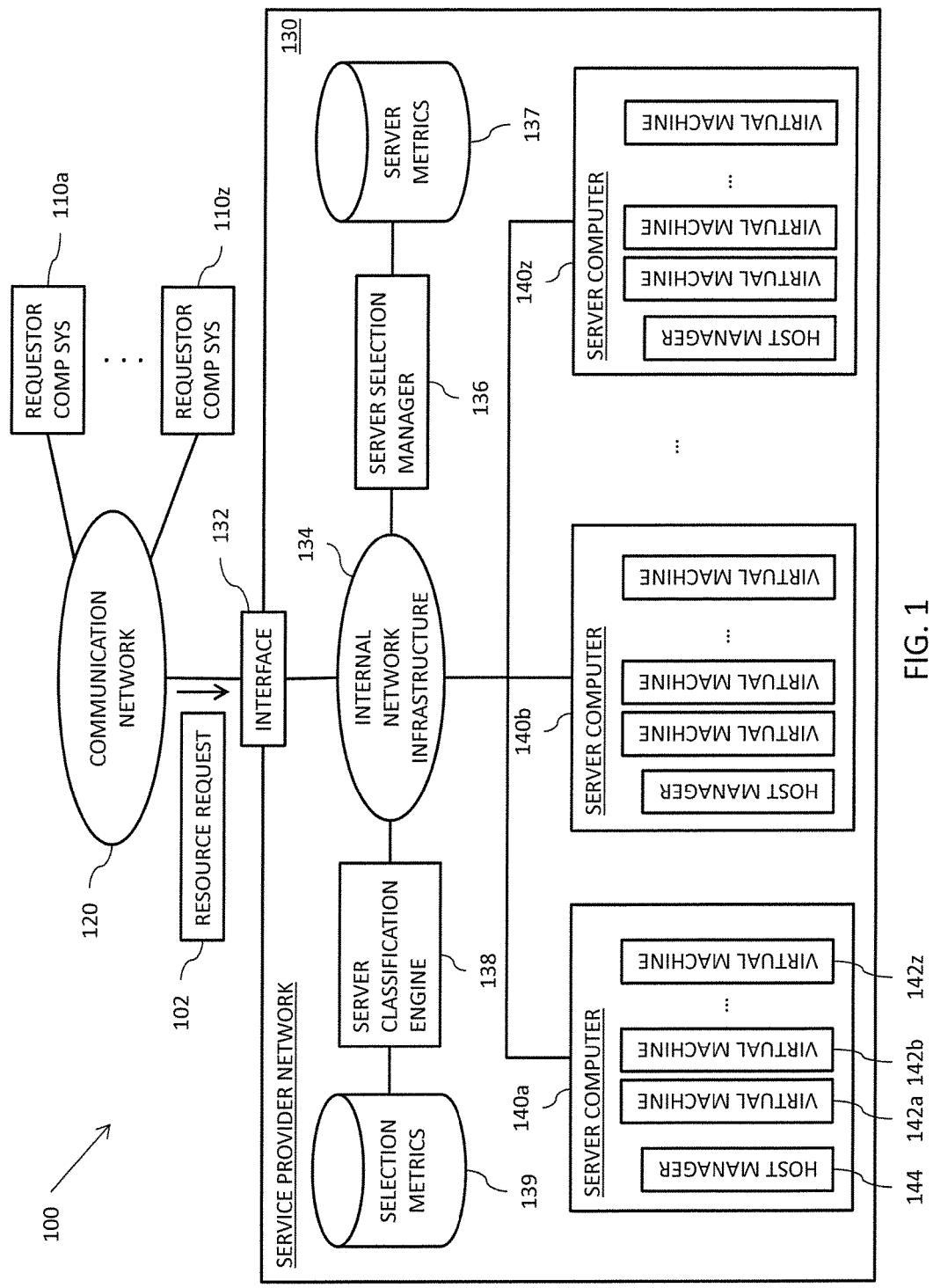
FIG. 1 is a block diagram illustrating selected components of an example system for computer resource allocation.

The following description is directed to technologies for computer resource allocation. Utilizing the technologies described herein, allocations of computer resources may be made intelligently by taking into account a large number of inputs. Additionally, feedback on allocation determinations may be obtained to improve future allocation determinations.

The various mechanisms disclosed herein for computer resource allocation may operate in conjunction with a network-based distributed computing environment operated by a service provider (which may be referred to herein as a "service provider network"), through which customers can purchase and utilize computer resources such as instances, data storage resources, database resources, networking resources, and other types of computer resources on a permanent or as-needed basis. As one particular example, a user may request an instance of a machine image (e.g., a virtual machine instance or an instance that runs directly on hardware), and a server computer can be selected to host (i.e., run the instance). The instance may be allocated all or a portion of the server's processing power, memory, storage, and networking bandwidth.

The service provider operating the service provider network may charge a fee for providing the computer resources, and in this case the requestor may be considered a customer of the service provider. The service provider might also utilize various purchasing models to determine how much to charge the customer for the use of computer resources. As mentioned above, customers of such a service provider can utilize the computer resources as building blocks to create custom solutions that provide various types of functionality, such as application hosting, backup and storage, content delivery, Web hosting, enterprise IT solutions, database services, and others.

A service provider network may include a number of servers that can each be partitioned into a number of virtual machines. Placing new virtual machines onto servers that already have a number of virtual machines running on them may lead to the new virtual machine running improperly (e.g., sub-optimally) or may cause the already-introduced virtual machines to run improperly.

As described in this document, a server classification engine can be used to help make intelligent decisions regarding on which server to place a request for an instance. The server classification engine may take into account previous placements of instances, the conditions existing on the selected servers at the time or placement, and the acceptability of the placement. When a new instance request is received, the server classification engine can examine the characteristics of the request and identify one or more servers that have a high probability of successfully hosting the instance. In addition, context for each instance at launch can be captured and classified as either a successful or unsuccessful launch. Over time, the server classification engine determines which launch contexts are predictably unsuccessful and avoids them in the future.

In some implementations, the servers that the server classification engine must evaluate may be prescreened. For example, servers that do not have the operational capacity to handle a request (e.g., because their processors are too busy, they do not have enough memory, or they do not have enough network bandwidth), servers that do not have the correct hardware, and servers that cannot host the instance type identified in the request can be eliminated from consideration. Because the number of variables for evaluating placement of a virtual machine may lead to excessively large number of permutations and combinations, reducing the number of servers under consideration may beneficial, especially in a large service provider network.

In particular implementations, once a launch context for a server indicates that the launch may be successful, the instance may be provisioned on one of the servers. Selecting between a number of servers that have a good chance of successfully providing computer resources may take into account operation characteristics internal to the server provider network (e.g., server pools, network traffic segmentation, and data center reliability).

Once the instance is launched, the instance may be monitored and classified as either successful or unsuccessful. In certain implementations, this classification may be performed automatically by examining operational metrics of the selected server and the launch context for the instance. Using the results of the classification, data used for selecting a server may be updated regarding the launch context (e.g., resource request, the state of the selected server at allocation, etc.) and a classification of whether the placement was successful. This data may be used the next time a similar resource request is received.

Making an intelligent decision regarding allocations of computer resources has a variety of features. There are a large number of possible conditions that could affect the quality of an allocation decision, and due to the combinatorial or even exponential nature of their mix, it is close to impossible for a heuristics-based algorithm, much less a human, to consider them all. Moreover, parameters that might be critical differentiators one day could very well be inconsequential the next day (such as the network load produced by a product launch which subsided the next day). Even allocating an incrementally small new resource on a large network may be a problem that can have disastrous results if poorly implemented. Inefficient use of the available resources, resource fragmentation, long lead time to react to changing conditions, outages, traffic spikes—all these aspects make the resource allocator a critical component for providing continuous service. Making a better allocation decision would be beneficial for customers and a service provider, as it would significantly cut down on operations load. Even customers with already existing allocations would benefit because intelligent server selection would help to eliminate instances in which a resource allocation that was working acceptably suddenly behaves erratically (e.g., due to the provisioning of a conflicting virtual machine instance on the same server).

Additionally, the described intelligent computer resource allocation provides a feedback system to affect the allocation of future requests based on changing conditions. Having to code changes to a heuristic placement process is difficult and makes the heuristic process more error prone due to the forking of the various decision points to cope with various extreme constraints. Additionally, there are a number of correlated conditions that placement logic does not or cannot take into consideration, such as finding place on a server that has plenty of memory, storage and CPU available, but is starved for networking capacity due to customers already collocated on the server. Thus, intelligent decision making may replace a limited, high maintenance and error-prone resource allocation process with a process that self-adapts to changing conditions and can be molded more easily to prefer and produce results skewed towards particular needs.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

FIG. 1 illustrates selected components of an example system 100 for computer resource allocation. At a high level, system 100 includes a number of requestor computer systems 110 that can send requests for computer resources (e.g., virtual machines) over a communication network 120 to a service provider network 130, which provides the computer resources. Requestors may be customers of the service provider or employees or agents of the service provider. Service provider network 130 may allow customers to purchase and utilize computer resources (which might also be referred to herein as "resources"), such as virtual machine instances (which might also be referred to herein as "virtual machines" or "instances"), networking resources, storage resources, or other types of computer resources, from a service provider that operates the service provider network 130. These resources may be purchased on a permanent or as-needed basis.

Requestor computer systems 110 may, for example, be personal computers, laptop computers, workstations, tablets, smart phones, servers, or any other appropriate computational device for communicating with service provider network 130 through communication network 120. Communication network 120 may, for example, be a combination of one or more local area networks, wide area networks, and wireless networks. In particular implementations, communication network 120 may include the Internet.

Among other things, service provider network 130 includes a number of server computers 140. As illustrated, each server computer 140 is capable of supporting a number of instances, such as virtual machines 142. A virtual machine may, for example, have a portion of the server computer's processing resources, memory resources, storage resources, and networking resources. Virtual machines 142 may vary in size from each other.

To request computer resources, a requestor computer system 110 may submit a resource request 102 through communication network 120. The resource request may, for instance, request that the service provider network 130 instantiate a new instance (e.g., a virtual machine or instance that runs directly on the hardware of a server), which would be provisioned on one of server computers 140. The resource request could, for example, include a machine image and instance type identifier that generally specifies the type of instance that is requested. For example, the instance type might generally specify a desired level of processing capability, a desired amount of memory, and a desired amount of storage for the new virtual machine instance, and the machine image may correspond to an operating system or an operating system including one or more installed programs.

Various types or configurations of computing resources may be available from the service provider network in different sizes. For example, a service provider might offer the virtual machine instances 142 or other types of data processing resources that are available for purchase and use that have many different configurations of processor capabilities, memory, storage, and operating system. A service provider might also offer other types of resources for purchase and use by customers. For example, a service provider might offer database resources, file or block data storage resources, networking resources, and/or other types of resources on a permanent or as-needed basis.

The service provider operating the service provider network 130 may charge customers a fee for using computer resources. The fee charged for a particular resource might be based upon the type and/or configuration of the resource. The fee charged for a particular resource might also be based upon the amount of time the resource is utilized. For example, in the case of a data processing resource, like a virtual machine instance 142a, the fee for use of the resource might be charged based upon the configuration of the virtual machine instance and the amount of time the virtual machine instance is utilized. In the case of a data storage resource, the fee might be computed based upon the amount of data stored and/or the amount of data transferred into or out of storage. The fees for other types of resources might be based upon other considerations. A service provider might also utilize various purchasing models to determine the amount to charge a customer for use of resources provided by the service provider.

Requestor computer systems 110 may provide resource requests to service provider network 130 through an interface 132. Interface 132 may, for example, provide a graphical user interface (GUI) or a web services application programming interface (API) to allow customers to submit resource requests. In one implementation, the functionality for submitting a resource request is provided by an API call through which a requestor can specify a resource request. For instance, an example API call might allow requestors of the service provider network 130 to specify information regarding a virtual machine instance 142 such as an instance type and machine image type. Alternatively, the information could be expressed as units of processing capability, memory, storage, and network bandwidth, etc.

In certain implementations, interface 132 may perform certain pre-processing on a resource request. For example, interface 132 may validate the requestor to make sure they are legitimate by forwarding the request to an access control system (not illustrated). Additionally, interface 132 may make sure the resource request is in an appropriate format. If the requestor is not legitimate or the resource request is not in the proper format, the resource request may be denied.

Within the service provider network 130, interface 132 couples to another computer network—network infrastructure 134. Network infrastructure 133 may, for example, be an intranet that is separate from communication network 120. Also connected to network infrastructure 134 are a server selection manager 136, a server classification engine 138, and server computers 140. Server selection manager 136 and server classification engine 138 may, for example, be implemented as services, which could include one or more computer systems. An example service is discussed below with respect to FIG. 2.

Once a proper resource request has been received at interface 132, interface 132 sends the resource request to a server selection manger 136, which identifies which server computer 140 the requested computer resource will be allocated upon. It should be appreciated that the server computers 140 may utilize a variety of different infrastructure platforms, which can include hardware platforms, software platforms and/or their respective configurations. For example, one server computer 140 might utilize a particular processor and chipset, while another server computer 140 might utilize a different processor and chipset. The server computers 140 might also be manufactured during different years. The server computers 140 might also have different operating systems or other software components installed thereupon. In this regard, it should be appreciated that server computers 140 having many different hardware and software configurations may be made available in the service provider network 130 for use in the manner described herein.

When the server selection manager 136 receives a resource request, the server selection manger may determine which server computers 140 are available for providing the requested computer resource. As mentioned previously, the resource request may specify general data regarding a requested virtual machine (e.g., processing capability, memory, storage, networking bandwidth, and operating system) or data such as an instance type and machine image. Server selection manager 136 may query server metrics database 137 to determine which of server computers 140 currently have the capability to run the requested virtual machine. As virtual machines 142 may come into existence and go out of existence on a continual basis and a particular virtual machine may have its actual hardware utilization (e.g., processing power and bandwidth requirements) change over time, server metrics database 137 may be continually updated regarding the operating metrics of the server computers.

In certain implementations, server metrics 137 may contain information in addition to performance-based data that can be used to analyze a resource request. For example, server computers may be grouped into pools depending on operating system. Thus, resource requests that require the use of a particular operating system would be directed to those server computers, unless they are at or near capacity, in which case a new server computer may be added to the pool. As another example, server computers 140 may be grouped based on network traffic segmentation, which allows locality of resources for certain pools. Thus, a resource request requiring access to another resource (e.g., virtual machine 142, storage, etc.), especially a resource request that requires a high bandwidth to the resource, may be placed in a pool for that virtual machine.

Once the server selection manager 136 has identified a set of server computers 140 that can run the virtual machine, server selection manager 136 may call server classification engine 138 to perform an analysis on the server computers in the set to identify which of the server computers is likely to successfully run the virtual machine. The data to be analyzed for the identification can generally be categorized as resource request data and server computer data. The resource request data may include any pertinent data regarding the requested resource (e.g., virtual machine instance). The data could, for example, be about the resource request (e.g., customer identifier, request type, instance type, virtual machine type, etc.) or the physical requirements for the requested resource (e.g., processing power, memory, storage, network bandwidth, etc.). The resource request data may be in the resource request itself (e.g., customer identifier, request type, instance type, virtual machine type, etc.) or inferred from the resource request (e.g., processing power, memory, storage, network bandwidth, etc.). The server computer data may include any pertinent data regarding the current state of the server computers or projected state of the server computers. The state of a server computer may, for example, include its physical operating parameters and the instances being executed thereon. For example, the operating parameters of each server computer regarding processing load, available memory, storage capacity, and network capacity may be determined. Additionally, data regarding other instances being hosted by the server computers may be determined (e.g., by customer identifier, instance type, etc.).

As part of this analysis, server classification engine 138 may query server metrics database 137 to determine the current state of the identified servers and analyze the resource request to determine the requested parameters. In certain implementations, the server selection manager 136 may have retrieved the state data for the identified servers when it retrieved the data to determine which of server computer 140 had the capability to host the virtual machine (e.g., by retrieving state data for each of server computers 140). Server selection manager 136 may pass this data to server classification engine 138.

Selection metrics database 139 may contain associations between various parameters for previous resource requests, the state of the server computers providing the requested computer resources at the time the resource requests were provisioned thereon, and the success of the requests. For example, selection metrics 139 may reflect that resource requests having specified hardware configurations did not perform well on particular server computers 140. Additionally, selection metrics 139 may reflect that resource requests having specified hardware configurations did not perform well on server computers having certain types of virtual machines currently running on the server computers. On the other hand, selection metrics 139 may reflect that resource requests having certain characteristics performed well on particular server computers and/or requested resources that run alongside certain types of virtual machines on a server computer performed acceptably on particular server computers. For example, a virtual machine requiring a high amount of network bandwidth may run perfectly well alongside a virtual machine using primarily local bandwidth.

Selection metrics 139 may generally contain launch contexts and success ratings for previous resource requests that were launched. A launch context may include resource request data (customer identifier, request type, instance type, virtual machine type, requested processing power, requested memory, requested storage, requested network bandwidth, etc.) and the state of the hosting server computer (e.g., physical operating parameters and the instances being executed thereon) at launch.

The number of factors that may be included in selection metrics 139 is quite large. For example, the selection metrics may reflect how high level factors affected previous resource requests, such as the particular server computers in the set, what cluster a particular server computer is in, what customer is making the request (e.g., based on a customer identifier), the request itself, what other customers have virtual machines running on the server computers, or what other virtual machines are running on the server computers. Additionally, the type of virtual machine and the instance type may also be analyzed. Physical requirements for previous resource requests (e.g., processing power, memory, storage, networking bandwidth, etc.) may also be factors (e.g., based on instance type or specification).

The utilization of other components in service provider network 130 may also be taken into account. For example, server computers 140 are often deployed in a rack with a switch to control the flow of information to each server computer. The bandwidth of the switch is sometimes a chokepoint for data flow to and from a server computer. Thus, this bandwidth may be reflected in selection metrics 139. (A virtual machine that primarily uses local storage may not be affect greatly by switch congestion, but a virtual machine that requires access to more computer systems may be greatly affected.)

In certain implementations, historic data regarding various components may also be reflected in selection metrics 139. For example, the workload associated with the requested instance over time may be reflected. Thus, if a virtual machine is expected to have high computing resource requirements in the near future, server classification engine 138 may take this into account. Additionally, selection metrics database 139 may also reflect historical data for the operational metrics of the server computers 140 based on the currently instantiated virtual machines. This data may be available from server metrics 137. Thus, if a server computer 140 under consideration is expected to have a high utilization in the near future, server classification engine 138 may take this into account.

To take into account the metrics specified by the resource request, the current state of server computers 140, and the selection metrics 139, server classification engine 138 may use a multi-input classification engine to predict which of the identified server computers 140 are likely to successfully run the requested virtual machine. As can be appreciated, the number of combinations and permutations of factors can quickly number in the thousands, if not millions, or even billions. Moreover, trying to decide between various server computers that have multiple beneficial attributes and detrimental attributes is not a straightforward task. Thus, using a classification engine to estimate the server computer(s) likely to successfully host the requested computer resources is a significant benefit. Determining the server computer(s) 140 likely to successfully provide computer resources may be evaluated in different ways. For example, the server classification engine 138 may identify which server computers have the highest likelihood of providing the requested computer resources or which server computers have the highest likelihood of not failing to provide the requested computer resources.

The server classification engine 138 may use any of a variety of techniques for classifying the likelihood that a server will successfully run a virtual machine. For example, the server classification engine may use Bayesian classification, neural networks, or any other appropriate machine-learning technique. In particular implementations, the server classification engine 138 uses positive and negative classifications that have been made previously in making the current prediction. In certain implementations, the server classification engine may be trained using selection metrics 139 (e.g., for a Bayesian classification).

In particular implementations, server classification engine 138 may build context for each candidate server computer 140. The context may, for example, include identifiers for other instances running on a candidate server computer 140 and operational states (e.g., high processing utilization, medium memory usage, low bandwidth utilization, etc.) of the server computer. Data for the context may, for example, be retrieved from server metrics database 137, by classification engine 138 or server selection manager 136.

In certain implementations, various operational parameters may be classified and mapped to variables that are more understandable to the server classification engine. For example, although CPU utilizations of 91% and 89% are different, they are not different in a material sense, at least in most cases.

Numerical values with large ranges, like CPU utilization, may, for example, be separated into various classifications. Thus, for example, CPU utilization of 0-20% could be classified as very low, CPU utilization of 21-40% could be classified as low, CPU utilization of 41-60% could be classified as medium, CPU utilization of 61-80% could be classified as high, and CPU utilization of 81-100% could be classified as very high. By classifying the ranges, the classification engine may be able to more accurately assess the values.

In certain implementations, the classifications may overlap slight. For example, very low could be 0-22%, low could be 18-42%, and medium could be 38-62%. Thus, a parameter may fall into two classes if it is in the overlap range.

Most any operational parameter that has a large range (e.g., 0-100) may be classified, and various numbers of classifications may typically be used for a parameter, although larger ranges tend to have a larger number of classifications, to provide more granularity between parameter values. The number of classifications for a parameter is typically between three to ten, to provide adequate granularity without making the classifications have fine distinctions between them. The number classifications for a parameter and their ranges are typically determined a priori and may be adjusted over time.

Classifications may also be mapped to variables that are more understandable to the server classification engine. For example, while descriptors like very low and low may be discernible to users, descriptors like low, medium, and high may not have any relational meaning to the server classification engine. Thus, the classifiers may be mapped to variables that have associated values. For instance, Roman numerals (e.g., I, II, III, IIII, etc.) may be used for numerical classification ranges. As another example, letters (e.g., a, ab, abc, abcd, etc.) could be used for numerical classification ranges.

The context for each candidate server computer 140 may be bundled with the resource request information (e.g., customer identifier, instance type, etc.) to build a virtual launch context for each candidate server computer. A launch context is the "end" result of the selection manager, and contains details of the request made coupled with details of the resource selected to satisfy the request. So, for classification, virtual records of the request coupled with the environmental and specific details of each server computer in part are created, and for each such resulting launch context, a classification is performed.

The server classification engine 138 may generate a probability that each candidate server computer successfully hosts the requested resource (e.g., virtual machine). In some modes of operations, only a single server computer may be identified as having a high probability of successfully hosting a resource. In other modes of operation, a number of server computers may have a high probability of successfully hosting a resource.

Once the server classification engine 138 has generated the probabilities of the identified server computers 140 successfully hosting the requested resources, the server selection manager 136 may allocate the computer resource.

A high probability may be one that exceeds a threshold (e.g., greater than 95%) or one that is significantly better than the probabilities for the other candidate server computers (e.g., having a greater a probability difference of greater than 3%.) If only one server computer has a high probability to provide the requested computer resources successfully, the requested computer resources may be allocated on that server computer. For example, a virtual machine may be instantiated on the identified server computer 140. If several servers computers have a have a high probability of successfully providing the computer resources (e.g., all above 90% and all within 3% of each other) identifiers for the server computers can be stored in a list and a further decision may be made regarding which server computer would be a good fit for allocating the computer resource. For example, if one of the server computers is trying to be filled as part of a pool, the computer resources may be allocated on that server computer. The server selection manager can in this example include executable instructions to check to see if the request is tagged as one that requires servers from a specific type of pool. Next, a check can be made to see if any servers in the list match the tag. If there are server computers that match the tag on the list, the server selection manager can select one from the filtered set, otherwise the server selection manager can select one of the servers from the list. As another example, if one of the server computers is part of a data center that has a fault condition (e.g., backup power failing), that server computer may be eliminated from consideration. If there are no further ways to distinguish between server computers, one of the server computer may be selected randomly.

To allocate the resource on the server computer, server selection manager 136 may generate a resource reservation that can be passed on to an execution workflow that will instrument the launch and setup of the requested resource on the server computer identified in the reservation. For instance, a host manager 144, which may be generally responsible for managing virtual machines on a server computer, may be responsible for configuring and launching an instance of a virtual machine. Host manager 144 may, for instance, be a hypervisor or another type of program configured to enable the execution of multiple virtual machines on a single server computer. The virtual launch request for the selected server computer may be stored for later analysis.

After allocating the requested computer resource on one of server computers 140, server classification engine 138 may also determine whether the computer resource is running successfully. For example, server classification engine 138 may monitor hardware-related parameters for a virtual machine and the server computers that host them. For instance, the server classification engine 138 may monitor network timeouts, processing unit load (e.g., very high or irregular), input/output loads on disks, network bandwidth, and/or local storage bandwidth. A virtual machine may be classified as a successful or unsuccessful launch based on this analysis. An unsuccessful launch could mean that the instance is not running at all or that the instance did not receive an appropriate portion of its requested parameters (e.g., processing power, memory, storage, network bandwidth, etc.).

Server classification engine 138 may also use feedback from customers to classify a virtual machine launch as successful or unsuccessful. For example, server classification engine 138 may monitor the time that a virtual machine operates. In certain implementations, for example, a customer may terminate a virtual machine soon after it is initiated, which typically indicates that the customer was not satisfied with the launch placement. Server classification engine 138 may infer from early terminations that the virtual machine was not running acceptably, and classify the launch as an unsuccessful launch based on the data by itself, or in combination with other information. Additionally, the server classification engine 138 may determine that a customer has lodged a complaint about the virtual machine. Complaints may, for example, be reported to the service provider by telephone. The complaints may be logged, typically on a system remote from server classification engine 138, and the data can be sent to the server metrics data store 137. Server classification engine 138 may access and/or receive the logs and use the information to classify the launch as unsuccessful.

If server classification engine 138 determines that a virtual machine is not running in an acceptable manner (e.g., due to one or more hardware-related parameters entering an unacceptable range), server classification engine 138 may identify the placement as not being successful. The server classification engine 138 may then update the selection metrics 139 to reflect that the identified server computer with the characteristics at the point of allocation of the computer resources resulted in unacceptable performance for the resource request. The server classification engine 138 may then use this data when the computer resources (or similar ones) are again requested.

The server classification engine 138 may also determine that a virtual machine is running in an acceptable manner (e.g., due to the hardware-related parameters being in an acceptable range or the virtual machine not running in an unacceptable manner) and classify the placement as being successful. The server classification engine 138 may then update the selection metrics 139 to reflect that the identified server computer with the characteristics at the point of allocation of the computer resources resulted in acceptable performance for the resource request. The server classification engine 138 may then use this data when the computer resources (or similar ones) are again requested.

In certain implementations, only certain allocations may be used in updating the selection metrics. For instance, allocations that had a high predicted probability of being successful (e.g., greater than 95%) and were successful probably offer little in regards to updated selection metrics. However, allocations that had a high probability of being successful and were not successful probably offer much in regards to updated selection metrics. Additionally, allocations that had a modest predicted probability of being successful (e.g., 81%) and were successful probably offer much in regards to updated selection metrics.

When a requestor (e.g., customer) has finished using a computing resource, such as the virtual machine instance 142*a*, the requestor may request that the requested resource be de-provisioned. In response thereto, server selection manager 136, or another component in the service provider network 130, may cause the computer resources to be de-provisioned. Other types of computer resources might also be provisioned and de-provisioned in a similar manner. The service provider network 130 might also provide functionality for automatically scaling and/or de-scaling resources based upon demand for the computer resources or other factors.

The various resources described above might also be provisioned and de-provisioned as needed in an automated fashion. For example, a customer might submit a virtual machine instance resource request to the service provider network 130 to instantiate a new instance of a virtual machine. In response to receiving such a request, server selection manager 136, or one or more other components within the service provider network 130, might create the new instance of the virtual machine as requested by the customer. The customer may then be permitted to utilize the new instance of the virtual machine as desired. Other types of computer resources might be instantiated in a similar fashion.

Prior to using the server classification engine 138 for the first time, the engine may have to be trained. Training the engine may, for example, be accomplished by identifying resource allocations that were acceptable and resource allocations that were not acceptable. In particular, a number of resource requests, along with the associated server metrics at the time of their provisioning, and an indication of whether the launch is classified as successful or unsuccessful may be determined. The data regarding the resource requests (e.g., user identifier, request identifier, requested processing power, requested memory, etc.), the associated server computer at the time of the provisioning, and the acceptability of the allocations may be provided to the engine so that it may make inferences regarding good and bad allocation decisions. This data may be stored in server selection metrics 139.

System 100 provides a variety of features. For example, server classification engine 138 allows an intelligent decision to be made regarding allocations of computer resources. There are a large number of possible conditions that could affect the quality of an allocation decision, and due to the combinatorial or even exponential nature of their mix, it is close to impossible for a heuristics-based algorithm, much less a human, to consider them all. Moreover, parameters that might be critical differentiators one day could very well be inconsequential the next day (such as the network load produced by a product launch that subsided the next day). Even allocating an incrementally small new resource on a large network may be a problem that can have disastrous results if poorly implemented. Various resource allocation problems, such as inefficient use of the available resources, resource fragmentation, long lead time to react to changing conditions, outages, and traffic spikes, make the server classification engine an advantageous component for providing continuous service. Making a better allocation decision would be beneficial for customers and a service provider, as it would significantly reduce operations load. Even customers with already existing allocations would benefit because server classification engine 138 would help to eliminate instances in which a resource allocation that was working acceptably suddenly behaves erratically (e.g., due to the launch of another instance on the same server).

Additionally, server classification engine 138 provides a feedback system to affect the allocation logic for future computer resource requests based on changing conditions. (Such extreme situations require code changes and make the heuristic process more error prone due to the forking of the various decision points to cope with various extreme constraints.) Additionally, there are a number of correlated conditions that placement logic does not or cannot take into consideration, such as finding place on a server that has plenty of memory, storage and CPU available, but is starved for networking capacity due to customers already colocated on the server. Thus, system 100 may replace a limited, high maintenance and error-prone resource allocation process with a process that self-adapts to changing conditions and can be molded more easily to prefer and produce results skewed towards particular needs.

Although FIG. 1 illustrates an example system for computer resource allocation, other systems for computer resource allocation may include fewer, greater, and/or a different arrangement of components. For example, server classification engine 138 may be part of server selection manager 136. Additionally, a system may include an admission control module.

Server selection manager 136 and classification engine 138 may be executed on the same server computer, on a fleet of server computers, on separate server computers, or on separate fleets of server computers. For instance, server selection manager 136 may be implemented on a first fleet of server computers, and server classification engine 138 may be implemented on separate fleet of server computers to obtain the probabilities for making the final decision.

Although the description presented herein with regard to FIG. 1 is described primarily in the context of virtual machine instances 142 on server computers, it should be appreciated that the embodiments disclosed herein might be utilized with other types of computer resources. The computer resources may be provided in one particular implementation by one or more data centers operated by the service provider. As known to those skilled in the art, data centers are facilities utilized to house and operate computer systems, such as the server computers 140, and associated components. Data centers also typically include redundant and backup power, communications, cooling, and security systems. The data centers might be located in geographically disparate locations, and might also be connected to various other facilities, such as co-location facilities, and various wide area networks ("WANs"), such as the Internet. In the environment shown in FIG. 1, a service provider might operate one or more data centers configured to provide the virtual machine instances 142 in the service provider network 130 to its customers. Details regarding the implementation of a service provider network 130 for providing the functionality disclosed herein will be provided below with regard to FIGS. 7 and 8.

Figure 2:
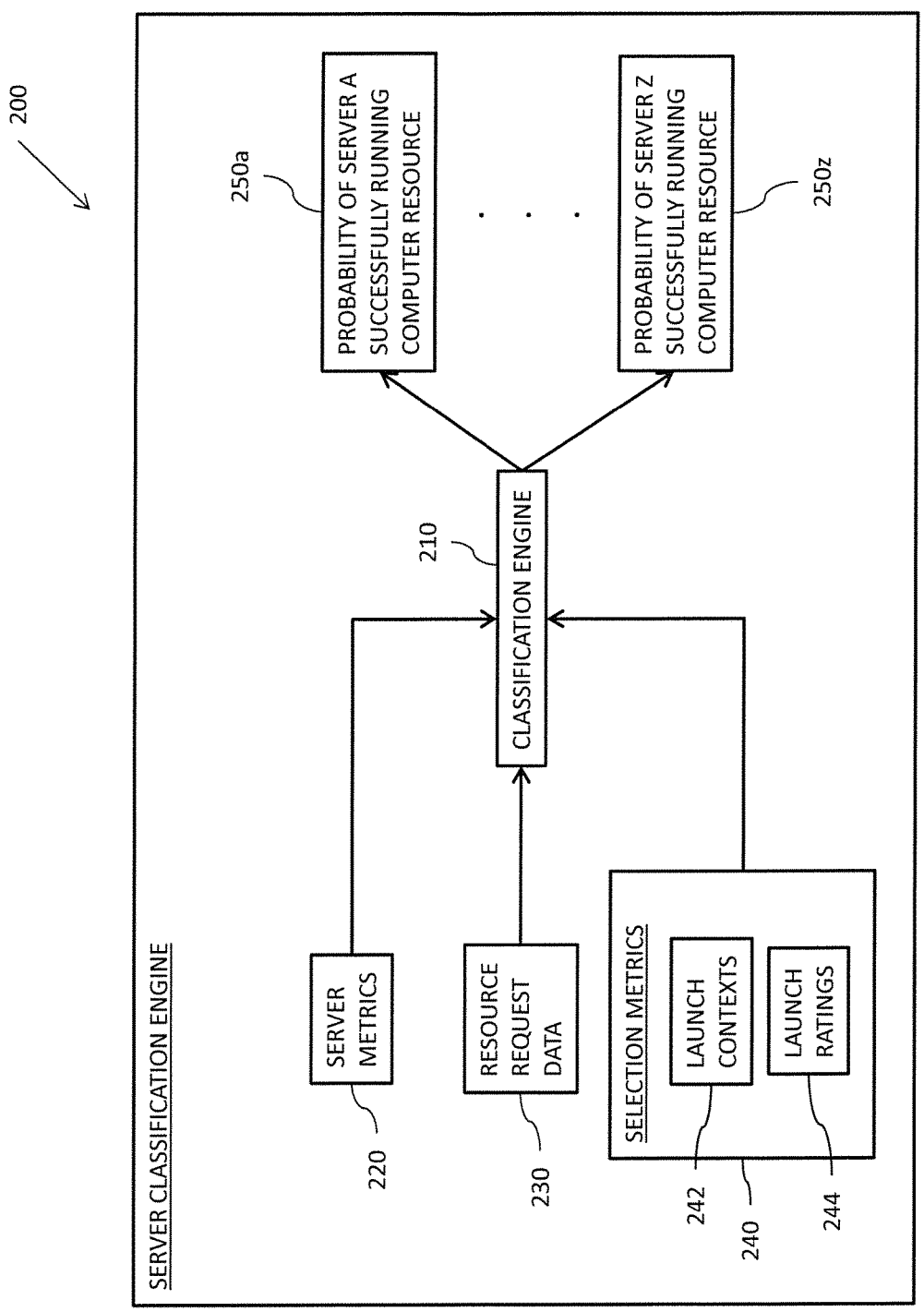
FIG. 2 is a block diagram illustrating selected components of an example server selection manager for computer resource allocation.

FIG. 2 illustrates selected components of an example server classification engine 200. Server classification engine 200 may, for example, be similar to server classification engine 138 in system 100.

Server classification engine 200 includes a classification engine 210 that receives server metrics 220, resource request data 230, and selection metrics 240 as inputs. Based on the inputs, classification engine 210 generates probability values 250 that each of a number of server computers will be able to successfully provide the requested computer resources. The server computers for which the classification engine 210 generates probability values 250 may or may not be pre-screened so that the classification engine 210 considers a limited number of potential server computers.

Server metrics 220 may include operational states of the servers to be evaluated. For example, the processing power, memory, storage, and network bandwidth currently being utilized, along with that which is reserved, may be evaluated. Additionally, historical trends for operational parameters may be available. Server metrics 220 may also include data regarding other users (e.g., user identifiers) of computer resources being executed on the server computers and other resource requests. The data regarding the resource requests may include request identifier, requested processing power, requested memory, requested storage, and requested bandwidth. The server metrics may also include information on certain configurations inside a server provider network (e.g., server pools, network traffic segmentation, and data center reliability).

Resource request data 230 may include data regarding the physical requirements for the request for computer resources (e.g., processing capability, memory, storage, and networking bandwidth). Additionally, resource request data 230 may include an identifier for the requester and an identifier for the request. Requests for computer resources may sometimes be reused. Thus, identifying a request may provide insight into its operational characteristics.

Selection metrics 240 includes launch contexts 242 for previous resource allocations and a launch ratings 244 (e.g., successful or unsuccessful) for each launch context. A launch context 242 may include data regarding a previous launch, including resource request data (e.g., customer identifier, request type, instance type, virtual machine type, requested processing power, requested memory, requested storage, requested network bandwidth, etc.) and the metrics of the hosting server computer (e.g., physical operating parameters and the instances being executed thereon as well as customer identifiers, instance types, virtual machine types, requested processing power, requested memory, requested storage, requested network bandwidth, etc.). The type of data that may be included in launch contexts 242 is quite large. For example, the launch contexts 242 may reflect high level factors, such as identifiers for particular server computers, what cluster a particular server computer is in, customers associated with previous requests, data regarding previous requests, what other customers had computer resources running on the server computers for previous requests, and what other computer resources were running on the server computers for previous requests. Additionally, requirements of previous resource requests (e.g., processing power, memory, storage, networking bandwidth, operating system, etc.) may be factors.

In certain implementations, historic data regarding various components may also be reflected in selection metrics 240. For example, the workload associated with requested computer resources over time may be reflected. For instance, if a virtual machine is expected to have a high computing resource requirements in the near future or at certain times of the day, classification engine 210 may take this into account. Additionally, selection metrics 240 may also reflect historical data for the operational metrics of server computers based on the currently allocated computer resources. This data may be available from server metrics 220. Thus, if a server computer under consideration is expected to have a high utilization in the near future, classification engine 210 may take this into account.

Classification engine 210 may take into account a number of variables specified by the server metrics 220, the resource request data 230, and the selection metrics 240 to predict which of a set of server computers is likely to successfully provide the requested computer resources. The various inputs may, for instance, be converted into a standard format and fed into the classification engine (e.g., as tokens). To accomplish the analysis, the classification engine may, for example, use a Bayesian inference, which is a statistical algorithm to classify partially known or partially unknown sets using a probability estimate.

As can be appreciated, the number of combinations and permutations of factors can quickly number in the thousands, if not millions or even billions. Moreover, trying to decide between various server computers that have a number of beneficial attributes and detrimental attributes is not a straightforward task. Thus, using classification engine 210 to estimate the server computer(s) likely to have its hosting of the requested computer resource classified as a success is a significant benefit.

In certain implementations, various operational parameters may be classified (i.e., assigned to different groups) and mapped to variables that can be processed by the classification engine. For example, numerical values with large ranges, like CPU utilization (e.g., 0-100%), may be separated into various classifications (e.g., very low is 0-20%, low is 20-40%, medium is 40-60%, high is 60-80%, and very high 80-100%). By classifying the ranges, the classification engine may be able to more accurately assess the values (e.g., as opposed to having to decipher between very granular distinctions). In some implementations, the classifications may overlap in values for the operations parameters. In certain implementations, classifications may also be mapped to variables that can be processed by the classification engine. For example, the classifications may be mapped to variables that have associated values. For example, Roman numerals (e.g., I, II, III, IIII, etc.) may be used for numerical classification ranges.

Classification engine 210 may use any of a variety of techniques for classifying the likelihood that a server's hosting of a virtual machine will be classified as successful. For example, classification engine 210 may use Bayesian classification, neural networks, or any other appropriate machine-learning technique. The classification engine uses positive and negative classifications that have been made previously in making the current prediction.

In implementations in which classification engine 210 is a Bayesian classifier, outputs 250 may be in two different sets. The first set includes servers that have a high probability of successfully hosting a virtual machine. For example, one server computer may have a 96% probability of successfully running the virtual machine, a second server computer may have an 87% probability of successfully running the virtual machine, and a third server computer may have a 76% probability of successfully running the virtual machine. The second set includes servers that have a high probability of unsuccessfully hosting the virtual machine (i.e., the virtual machine instance will be classified as unsuccessful by the classification engine if it is run on the host). For example, a fourth server computer may have a 92% probability of not successfully running the computer resource, a fifth server computer may have a 88% probability of not successfully running the computer resource, and a third server computer may have a 82% probability of not successfully running the computer resource. By analyzing the probabilities in the first set, the server computers that are likely to be successful in running the computer resource may be identified. In example embodiments the server classification engine may only classify potential launches on one axis instead of classifying launches as either successful or unsuccessful. For example, in an embodiment where potential launches are classified based on whether the launch is likely to be successful a launch that is likely to be unsuccessful would have a low probably of success (e.g., 5% or 10% likely to be successful). Likewise, if the server classification engine is configured to estimate unsuccessful launches a launch with a high probability of success would be given a low probability of being unsuccessful.

In certain implementations, only one server computer may be identified from the results of the classification engine. As another example, only one server computer may be identified as being able to provide the requested computer resources with a high enough probability (e.g., greater than 90%). As an additional example, one server computer may have a very high probability of successfully running the computer resources relative to the other server computers (e.g., 99% versus 90%).

On the other hand, sometimes several server computers may have a relatively high probability of successfully running a computer resource (e.g., above 90%), and a further decision may be made regarding which server computer would be a good fit to allocate the computer resources on. For example, if one of the server computers is trying to be filled as part of a pool, the computer resources may be allocated on that server computer. As another example, if one of the server computers is part of a data center that has a fault condition (e.g., backup power failing), that server computer may be eliminated from consideration. If several server computers have a high probability of successfully running a computer resource and there are no metrics with which to distinguish between them, one or the server computers may be randomly assigned for allocation of the computer resources.

After a computer resource has been allocated, the various inputs (e.g., metrics for selected server and the data from resource request) along with the allocation decision may be recorded in launch contexts 242. Later, a decision may be made regarding whether the computer resources were successfully allocated (e.g., by monitoring operational parameters or the time that a virtual machine operates). After it is determined if a computer resource was allocated successfully, launch ratings 244 may be updated to reflect that the identified server computer with the characteristics at the point of allocation of the requested computer resources resulted in acceptable or unacceptable performance for the resource request. Classification engine 210 may then use this data when the computer resource request (or a similar one) is again received.

In certain implementations, only certain allocations may be used in updating the selection metrics. For instance, allocations that had a high predicted probability of being successful (e.g., 95%) and were successful probably offer little in regards to updated selection metrics. However, allocations that had a high probability of being successful and were not successful probably offer much in regards to updated selection metrics. Additionally, allocations that had a modest predicted probability of being successful (e.g., 81%) and were successful probably offer much in regards to updated selection metrics.

Figure 3:
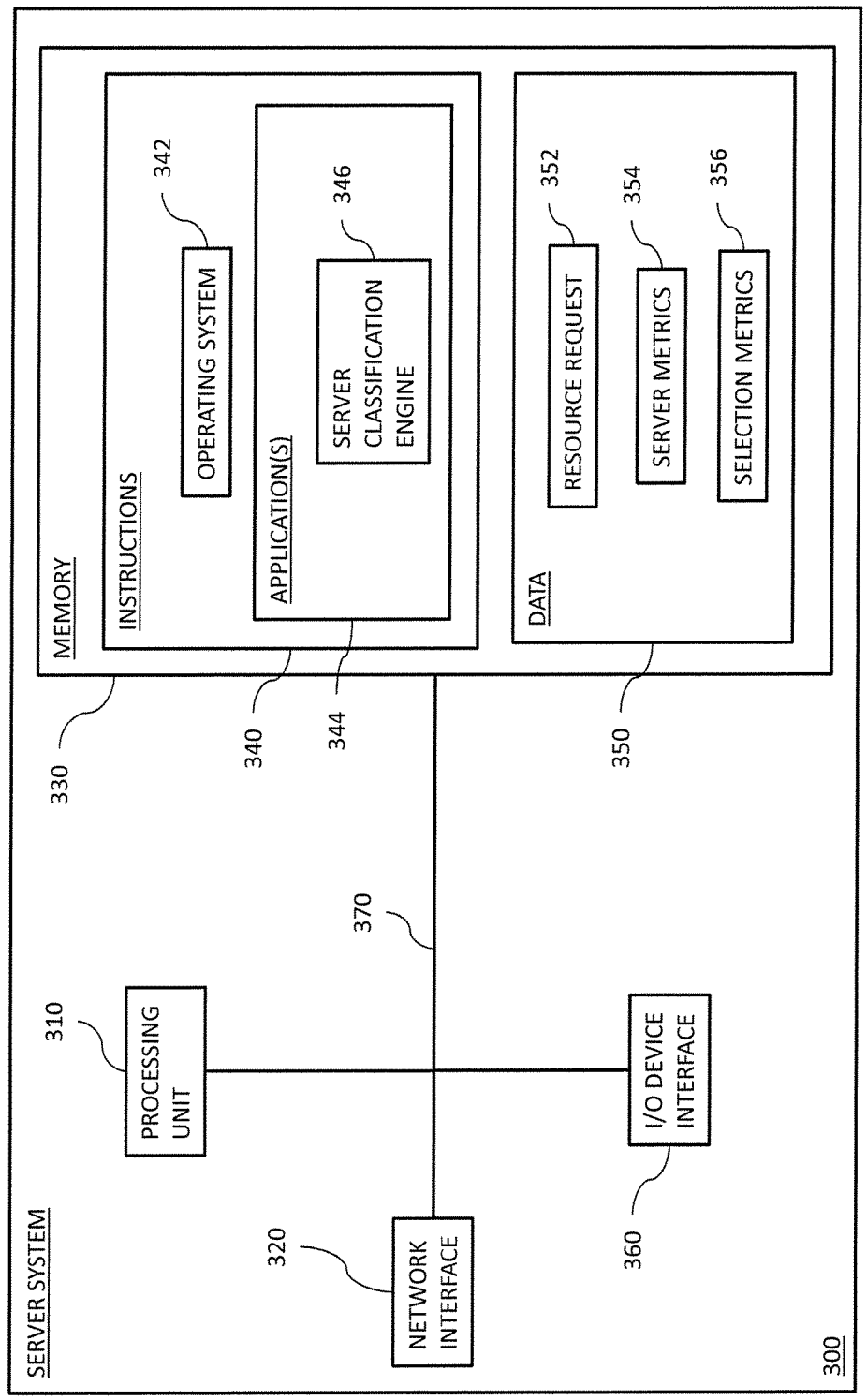
FIG. 3 is a block diagram illustrating selected components of an example server system for computer resource allocation.

FIG. 3 illustrates an example server system 300 for computer resource allocation. Server system 300 includes an arrangement of computer hardware and software components that may be used in computer resource allocation. Server system 300 may, for example, be used in system 100.

Server system 300 includes a processing unit 310, a network interface 320, memory 330, and an input/output device interface 360, all of which may communicate with one another by way of a communication network 370.

Processing unit 310 may include one or more processors (e.g., one or more microprocessors). The processors could, for instance, operate according to reduced instruction set computer (RISC) or complex instruction set computer (CISC) principles. In general, processing unit 310 may include any device that manipulates information in a logical manner.

Network interface 320 may provide server system 300 with connectivity to one or more networks (e.g., LANs and/or WANs) or computing systems. Processing unit 310 may thus receive information and instructions from and provide information and instructions to other computing systems (such as user devices) or services via a communication network. Network interface 320 may also communicate to and from memory 330.

Memory 330 may, for example, include random access memory (RAM), read-only memory (ROM), disc memory, and/or other persistent or non-transitory computer-readable storage media. Various items may be stored in different portions of memory 330 at various times (e.g., on a disc and in RAM). Memory 330, in general, may be any combination of devices for storing information.

Memory 330 includes instructions 340 and data 350. Instructions 340 include an operating system 342 (e.g., Windows, Linux, or Unix), which provides general administration and operation of server system 300, and one of more applications 344 that processing unit 310 executes in order to allocate computer resources. Applications 344 include a server classification engine 346, which is responsible analyzing server computers for a computer resource request. Data 350 includes the data required for and generated by applications 340. For instance, data 350 includes a resource request 352, which may, for example, specify general operational requirements for a request, server metrics 354, which may, for example, store current operational states of server computers, and selection metrics 356, which may store historic data regarding resource requests, operational states for server computers selected to provide the requested resources, and the acceptability of the allocations of the resource requests.

Input/output device interface 360 allows one or more user devices (e.g., keypads, pointing devices, microphones, etc.) to communicate with server system 300, and server system 300 to provide output to a user (e.g. through a display, a speaker, a projector, etc.). A communication interface may, for instance, be a network interface card (whether wireless or wireless), a bus (e.g., parallel or serial), or any other device for interfacing with a server system.

In some modes of operations, processing unit 310 may execute server classification engine 346, which in turn may analyze the resource request 352, the server metrics 354, and the selection metrics 354 as inputs. Based on the inputs, processing unit 310 may execute server classification engine 346, which generates likelihoods that each of a number of server computers will be able to successfully provide the requested computer resources. Processing unit 310 may take into account a number of variables specified by the resource request 352, the server metrics 354, and the selection metrics 356 to predict which of a set of server computers is likely to successfully run the requested computer resources. For example, processing unit 310 may use a Bayesian inference, which is using a statistical algorithm to classify partially known or partially unknown sets using a probability estimate, to calculate the probabilities.

As can be appreciated, the number of combinations and permutations of factors can quickly number in the thousands, if not millions or even billions. Moreover, trying to decide between various server computers that have a number of beneficial attributes and detrimental attributes is not a straightforward task. Thus, using a server classification engine to estimate the server computer(s) likely to successfully provide the requested computer resource is a significant benefit.

Processing unit 310 may also determine whether computer resources are being provided in a successful manner. Processing unit 310 may, for example, accomplish this by monitoring operational parameters for a computer resource. Upon determining the success of the computer resources, processing unit 310 may update the selection metrics 356 with the success (e.g., acceptable or unacceptable) of the computer resource allocation. The success may, for example, be associated with the identified server computer and its state at the point of allocation of the computer resource. Processing unit 310 may then use this data when the computer resource request (or a similar one) is again received.

FIG. 4 illustrates an example process 400 for computer resource allocation. Process 400 could, for example, be implemented by server selection manager 136 in system 100.

Process 400 calls for determining whether a request for computer resources has been received (operation 404). A request may, for example, be for a virtual machine. A request for computer resources may, for example, be received via a web service application program interface exposed by a web server to a communication network, such as the Internet. As described in earlier paragraphs, the request could specify operating parameters for the computing resources. For example, the request could specify a machine image to base the computing resource on and an instance type. In the same or an alternative configuration, the request could specify operating parameters such as processing power, memory, storage, and network bandwidth. If a request for computer resources has not been received, process 400 calls for waiting for such a request.

Once a request for a computer resource has been received, process 400 calls for retrieving metrics for a plurality of servers (operation 408). The metrics may, for example, include the availability (e.g., current and/or projected) of each server's processing power, memory, storage, and network bandwidth. The server metrics may be collected at the time a request is received or prior to the time a request is received. Other metrics may, for example, include the other instances running on the server. If the service metrics are collected prior to the time a request is received, the server metrics might be cached in an appropriate data store for use when a request is received.

Process 400 also calls for determining a set of server computers able to fulfill the requirements of the request (operation 412). Determining the set of server computers may, for example, include comparing the requirements for the request against the metrics for the servers to see which servers can meet the request's requirements (e.g., processing power, memory, storage, and bandwidth). Additionally, the determination may take into account, which server computers are capable of hosting the instance type associated with the request.

Process 400 also calls for identifying the server computer(s) in the set that are likely to successfully provide the computer resources (operation 416). Identifying the server computer(s) may, for example, include executing a server classification engine (e.g., a Bayesian classification scheme) regarding the request's requirements, the metrics of the server computers in the set, and previous allocations computer resources on various server computers. The server classification engine may return a probability that each server computer can successfully provide the computer resource, and a server computer with a high likelihood may be selected.

Process 400 further calls for allocating the requested computer resources on an identified server computer (operation 420). Allocating the requested computer resources may, for example, include initiating a virtual machine on a server computer.

In certain implementations, only one server computer may be identified in operation 416. For example, only one server computer may be identified as being able to successfully provide the requested computer resources. As another example, only one server computer may be identified as being able to run the requested computer resources with a high enough probability (e.g., greater than 90%).

On the other hand, sometimes several servers computers may have a relatively high probability of successfully providing computer resources (e.g., above 90%), and a decision may be made regarding which server computer would be a good fit to allocate the computer resources. For example, if one of the server computers is trying to be filled as part of a pool, the computer resources may be allocated on that server computer. As another example, if one of the server computers is part of a data center that has a fault condition (e.g., backup power failing), that server computer may be eliminated from consideration. If several server computers are still eligible, one of the server computers may be selected randomly.

Although FIG. 4 illustrates a process for computer resource allocation, other processes for computer resource allocation may include fewer, greater, and/or a different combination of operations. For example, a process may not include determining a set of server computers able to fulfill the request's requirements. This may, for example, be accomplished, in part, by determining which server computer(s) are likely able to successfully provide the requested computer resources. Additionally, a process may not include allocating the requested computer resources. This may, for example, occur if a process just provides a recommendation for server computer placement. Various operations of process 400 may occur in a contemporaneous or simultaneous manner.

FIG. 5 illustrates an example process 500 for computer resource allocation. Process 500 could, for example, be implemented by server classification engine 138 in system 100 and used in conjunction with process 400. For instance, process 400 could be procedures for executing operation 416.

Process 500 calls for retrieving metrics for a set of server computers (operation 504). The metrics may, for example, include values that describe the different server computers in the set. For example, for each server computer, the values can include identifiers for the machine images the instances on the server are based on and the availability (e.g., current and/or projected) of each server computer's processing power, memory, storage, and network bandwidth. The server metrics may be collected at the time or prior to the time. If the service metrics are collected prior to the time a request is received, the server metrics might be cached in an appropriate data store for use when a request is received.

Process 500 additionally calls for analyzing a computer resource request (operation 508). Analyzing a computer resource request may, for example, reveal the processing power, memory, storage, and network bandwidth associated with the request. Moreover, analyzing the request may indicate the identity of the requestor and whether the request or a similar request has been received previously.

Process 500 also calls for building a virtual reservation for each server computer in the set (operation 512). In an embodiment, this includes taking values for the launch request, including the machine image identifier and customer identifier in the request, and appending it to the values for each server computer. The virtual reservation thus represents how each server computer in the set would look if the customer instance in the launch request was placed on each server.

Process 500 further calls for passing each virtual reservation into a classification engine (operation 516). The classification engine classifies each virtual reservation against a trained set of older launch contexts and computes probability scores for each virtual reservation.

The number of factors that may be included in older launch contexts is quite large. For example, the selection metrics may reflect how high level factors affected previous resource requests, such as the particular servers in the set, what cluster a particular server is in, what customer is making the request, the request itself, what other customers have virtual machines running on the server computers, or what other virtual machines are running on the server computers. Additionally, physical requirements of previous resource requests (e.g., processing power, memory, storage, networking bandwidth, etc.) may be factors.

Process 500 also calls for running the classification engine to identify the probability of one or more server computers successfully providing the requested computer resources (operation 520). The inputs to the engine may include the server metrics and/or the data extracted from the resource request, which may be packaged in the form of the virtual launch contexts for each prospective server computers, and the metrics regarding previously launched instance, which may be packaged in the older launch contexts. Identifying the probability of one or more server computers successfully providing computer resources may be performed in different ways. For example, the engine may identify which server computers have a strong likelihood of providing the requested computer resources or which server computer has a strong likelihood of not failing to provide the requested computer resources.

Although FIG. 5 illustrates a process for computer resource allocation, other processes for computer resource allocation may include fewer, greater, and/or a different combination of operations. For example, a process may include determining a set of server computers able to fulfill the request's requirements. Additionally, a process may include allocating the requested computer resource on a server computer. Various operations of process 500 may occur in a contemporaneous or simultaneous manner.

In particular implementations, a process may include retrieving launch contexts for previous allocations. A selection metrics database may contain associations between various parameters for previous resource requests and the success or failure of the server computer selections for the requests, and these may be formed into launch contexts. For example, selection metrics may reflect that resource requests having specified hardware configurations did not perform well on particular server computers. Additionally, selection metrics may reflect that resource requests having specified hardware configurations did not perform well on server computers having certain types of virtual machines currently running on a server computer. On the other hand, server metrics may reflect that resource requests having certain characteristics performed well on particular server computers and/or with certain types of virtual machines running on a server computer. For example, a virtual machine requiring a high amount of network bandwidth may run perfectly well alongside a virtual machine using primarily local bandwidth. In some implementations, these launch contexts may have already been trained into the classification engine when a resource request is received.

FIG. 6 illustrates an example process 600 for computer resource allocation. Process 600 could, for example, be implemented by server classification engine 138 in system 100 and used in conjunction with process 400.

Process 600 calls for determining whether computer resources are running successfully (e.g., acceptably or unacceptably) on a server computer (operation 604). For example, the server classification engine may monitor whether the instance actually launched, whether the instance launched and then was immediately terminated by the customer, whether the instance launched and then crashed, and/or whether the customer submitted a complaint about the instance's performance, as well as hardware-related parameters for the computer resources. For a virtual machine, for example, network timeouts, processing unit load (e.g., very high or irregular), input/output loads on disks, network bandwidth, and/or local storage bandwidth may be monitored. Acceptability may achieved by meeting certain performance metrics. Unacceptability may be achieved by failing to meet on or more performance metrics. Additionally, the customer's view of the computer resource may be determined (e.g., by inference or complaint).

Process 600 also calls for determining whether to update the selection metrics (operation 606). Determining whether to update the selection metrics model may, for example, take into account whether the computer resources are running successfully and the strength of the prediction. For example, allocations that had a high predicted probability of being successful (e.g., 95%) and were successful probably offer little in regards to updated selection metrics. However, allocations that had a high probability of being successful and were not successful probably offer much in regards to updated selection metrics. Additionally, allocations that had a modest predicted probability of being successful (e.g., 81%) and were successful probably offer much in regards to updated selection metrics. If the selection metrics should not be updated, process 600 is at an end. If, however, the selection metrics should be updated, process 600 calls for updating the selection metrics regarding whether the computer resources are running successfully on the server computer (operation 608). Updating the selection metrics may, for example, include determining the metrics for the server computer at the time the computer resource were allocated. The selection metrics may, for example, be able to take into account the requirements for the computer resources (e.g., processing power, memory, storage, and networking bandwidth), the metrics of the server computer providing the computer resources, and the success (e.g., acceptability or unacceptability) or the allocation. The server classification engine may update its probabilistic estimates for the request or similar requests based on whether the requested computer resources are running acceptably on the server computer.

Although FIG. 6 illustrates a process for computer resource allocation, other processes for computer resource allocation may include fewer, greater, and/or a different combination of operations. For example, a process may not include determining whether to update the selection metrics, once the success of the allocation has been determined. For example, the selection metrics may be updated for every allocation. Various operations of process 600 may occur in contemporaneous or simultaneous manner.

Figure 7:
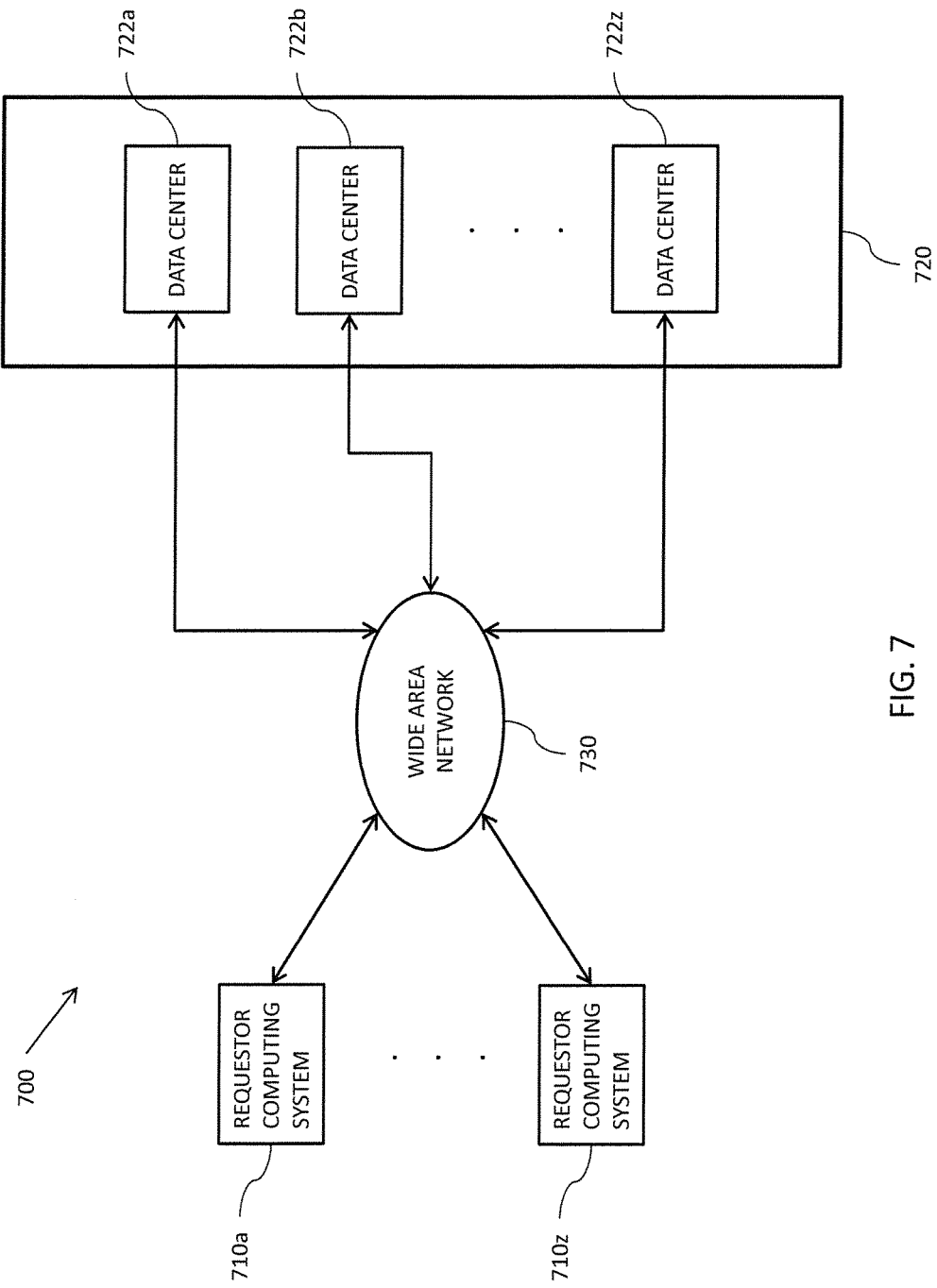
FIG. 7 is a block diagram illustrating selected components of an example service provider network configured to provide functionality for implementing virtual machine instances and other types of computer resources, according to one embodiment disclosed herein.

FIG. 7 illustrates an example system 700 for computer resource allocation. System 700 includes a service provider network 720 that may be configured to provide the functionality described above for computer resource allocation. As discussed briefly above, the service provider network 720 can provide computer resources on a permanent or an as-needed basis. The computer resources provided by the service provider network 720 may include various types of computer resources, such as data processing resources, data storage resources, networking resources, data communication resources, and the like.

Each type of computing resource may be general-purpose or may be available in a number of specific configurations. For example, and as described briefly above, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like.

As also mentioned briefly above, the computer resources provided by the service provider network 130 are enabled in one implementation by one or more data centers 722 (which may be referred to herein singularly as "a data center 722" or in the plural as "the data centers 722"). The data centers 722 are facilities utilized to house and operate computer systems and associated components. The data centers 722 typically include redundant and backup power, communications, cooling, and security systems. The data centers 722 might also be located in geographically disparate locations. One illustrative configuration for a data center 722 that implements aspects of functionality disclosed herein for user-influenced placement of virtual machines will be described below with regard to FIG. 8.

The customers and other users of the service provider network 720 may access the computer resources provided by the service provider network 720 over a WAN 730 using a suitable customer computing system 710. Although a WAN 730 is illustrated in FIG. 7, it should be appreciated that a local-area network ("LAN"), the Internet, or any other networking topology known in the art that connects the data centers 722 to remote requesters (e.g. customers and other users) may be utilized. It should also be appreciated that combinations of such networks might also be utilized.

Determining a server computer on which to allocate computer resources is typically performed once a data center 722 has been selected. A data center may, for example, be selected based on the resource request (e.g., if the resource request specifies a particular region or data center) or based on an assignment scheme (e.g., round robin). In certain implementations, a selection between server computers in different data centers may be made if the data centers are in close proximity.

Figure 8:
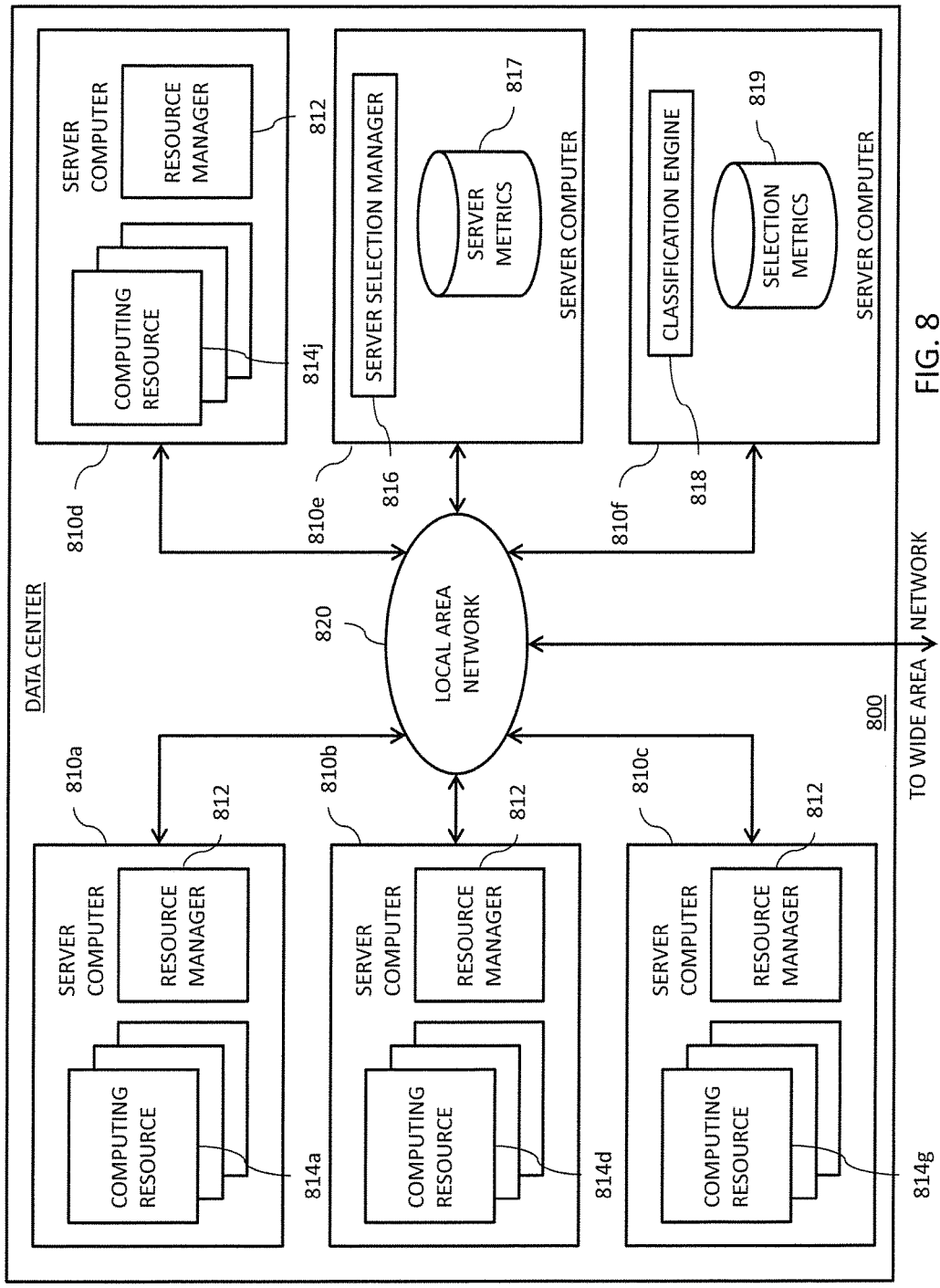
FIG. 8 is a block diagram illustrating selected components of an example data center for computer resource allocation.

FIG. 8 illustrates an example data center 800 in which resource allocation may occur. Data center 800 includes a number of server computers 810 (which may be referred to herein singularly as "a server computer 810" or in the plural as "the server computers 810") for providing computer resources such as those described above.

The server computers 810 may be standard tower or rack-mount server computers configured appropriately for providing the computer resources described herein. For example, in one implementation, the server computers 810 are configured to provide the computer resources 814. As mentioned above, the computer resources 814 might be data processing resources such as virtual machine instances, data storage resources, database resources, networking resources, and others. Some of the servers 810 might also be configured to execute a resource manager 812 capable of instantiating and/or managing the computer resources. In the case of virtual machine instances, for example, the resource manager might be a hypervisor or another type of program configured to enable the execution of multiple virtual machine instances on a single server computer.

Among server computers 810, the data center 810 includes server computers 810*e-f*, which may be reserved for executing various software components for managing the operation of the data center 800, the other server computers 810, and the computer resources. In some implementations, such as those described above, the server computer 810*e* might be configured to execute a server selection manager 816 and/or other software components described herein. Additionally, the server computer 810*f* might be configured to server metrics 817, although these could be located remotely from server computer 810*e* in certain implementations. The server computer 810*f* might be configured to execute a server classification engine 818 and/or other software components described herein. Additionally, the server computer 810*f* might be configured to server selection metrics 819, although these could be located remotely from server computer 810*f* in certain implementations. Other computing systems within the data center 800 might also be utilized to execute these and other components. Other configurations might also be utilized.

In the data center 800, an appropriate LAN 820 is utilized to interconnect the server computers 810. The LAN 820 is also connected to a WAN (e.g., as illustrated in FIG. 8).

It should be appreciated that the configuration and network topology illustrated in FIGS. 1-8 has been greatly simplified and that many more computing systems, networks, and networking devices may be utilized to interconnect the various computing systems disclosed herein and to provide the functionality described above. For example, appropriate load balancing devices or software modules might also be utilized for balancing a load between each of the data centers 810, between each of the server computers 810 in each data center 810, and, potentially, between computer resources in each of the data centers 810. It should be appreciated that the data center 800 described with respect to FIG. 8 is merely illustrative and that other implementations might be utilized.

The various illustrative logical blocks and modules described in connection with the implementations disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the implementations described herein in which elements or functions may be deleted or executed out of order from that shown or discussed, including substantially concurrently or in reverse order, depending on the functionality involved as would be understood by those skilled in the art.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain implementations require at least one of X, at least one of Y, and at least one of Z to each be present.

Conditional language such as, among others, "can," "could," "might" or "may," unless specifically stated otherwise, are otherwise understood within the context as used in general to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular embodiment.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Figure 9:
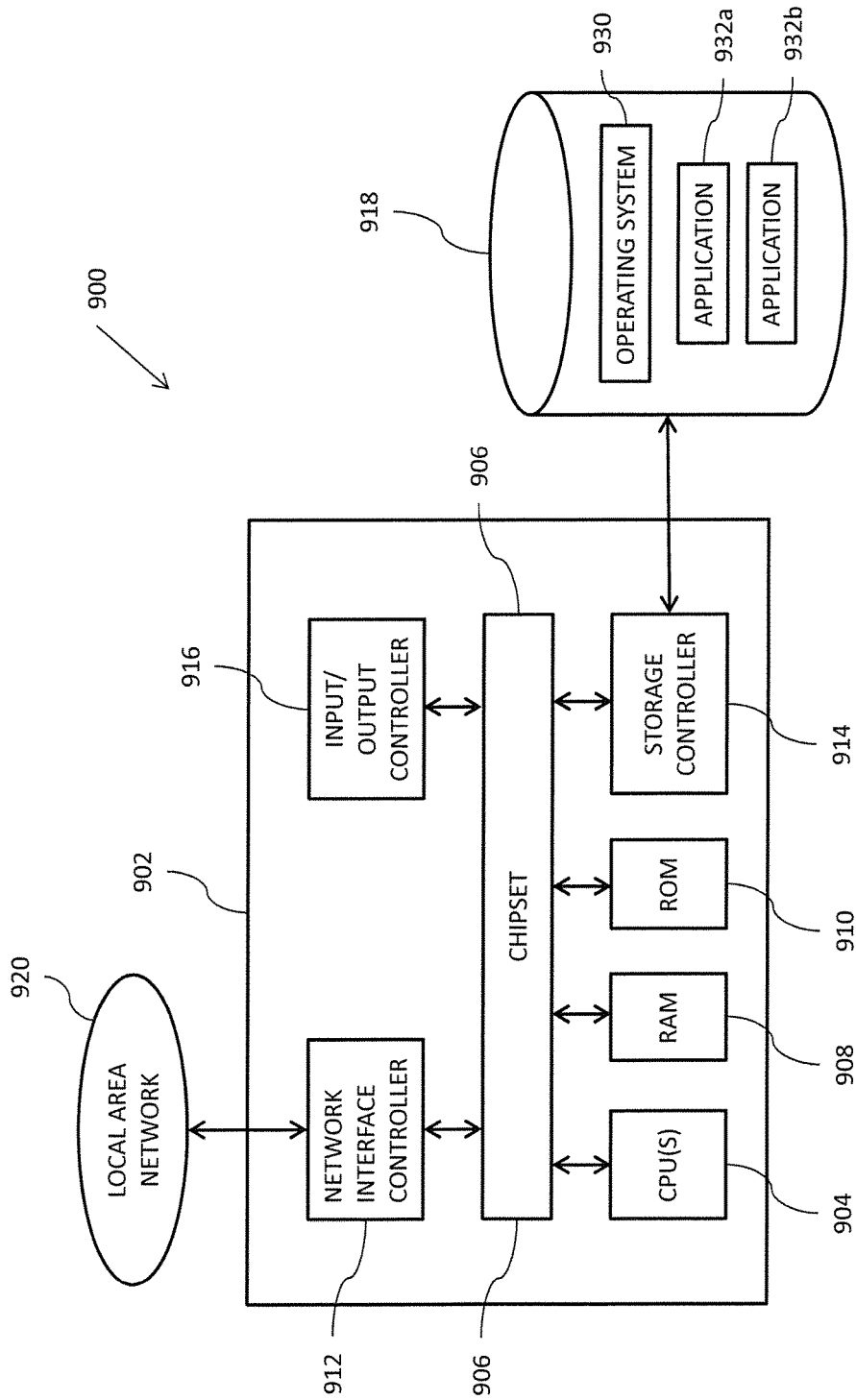
FIG. 9 is a block diagram illustrating selected components of an example system for computer resource allocation.

FIG. 9 illustrates an example computer system 900 capable of executing the program components described above for computer resource allocation. Computer system 900 may illustrate a conventional server computer, workstation, desktop computer, laptop, tablet, network appliance, personal digital assistant ("PDA"), e-reader, smart phone, or other computing device, and may be utilized to execute any aspects of the software components presented herein. For example, the computer system 900 may be utilized to implement the various components described above with regard to FIGS. 1-3.

The computer system 900 includes a baseboard 902, or "motherboard," which is a printed circuit board to which a multitude of components or devices may be connected by way of a system bus or other electrical communication paths. Computer system 900 includes one or more central processing units ("CPUs") 904. The CPUs 904 may, for example, be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates.

These basic switching elements may be combined to create more complex logic circuits, including registers, adders, subtractors, arithmetic logic units, floating-point units, and the like.

Chipset 906 provides an interface between the CPUs 904 and the remainder of the components and devices on the baseboard 902. The chipset 906 may provide an interface to a random access memory ("RAM") 908, used as the memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer system 900 to other computing devices over the network 920. It should be appreciated that multiple NICs 912 may be present in the computer system 900, connecting the computer to other types of networks and remote computer systems.

The computer system 900 may be connected to a mass storage device 918 that provides non-volatile storage for the computer. The mass storage device 918 may store system programs, application programs, other program modules, and data, which have been described in greater detail herein. The mass storage device 918 may be connected to the computer system 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer system 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer system 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer system 900 may further read information from the mass storage device 918 by detecting the physical states or characteristics of one or more particular locations within the physical storage units.

In addition to the mass storage device 918 described above, the computer system 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer system 900.

By way of example, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer system 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs 932 and data utilized by the computer system 900. For example, mass storage device 918 may store a server selection manager like server selection manager 136 or a server classification engine such as server classification engine 138 as an application and server metrics and selector metrics as data. The mass storage device 918 might also store other programs and data not specifically identified herein.

In certain embodiments, the mass storage device 918 or other computer-readable storage media is encoded with computer-executable instructions which, when loaded into the computer system 900, transform the computer from a general-purpose computing system into a special-purpose computer capable of implementing the embodiments described herein. These computer-executable instructions transform the computer system 900 by specifying how the CPUs 904 transition between states, as described above. According to one embodiment, the computer system 900 has access to computer-readable storage media storing computer-executable instructions which, when executed by the computer system 900, perform the various processing routines described above. The computer system 900 might also include computer-readable storage media for performing any of the other computer-implemented operations described herein.

The computer system 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer system 900 may not include all of the components shown in FIG. 9, may include other components that are not explicitly shown in FIG. 9, or may utilize an architecture completely different than that shown in FIG. 9.

Based on the foregoing, it should be appreciated that various technologies for computer resource allocation have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. A number of implementations for computer resource allocation have been described, and several others have been mentioned or suggested. Moreover, those of ordinary skill in the art will readily recognize that the number of additions, deletions, substitutions, and modifications may be made to the implementations while still achieving computer resource allocation. Thus, the scope of the protected subject matter should be judged based on the following claims, which may encompass one or more aspects of one or more of the implementations.

What is claimed is:

1. A computer-readable storage medium having computer-executable instructions stored thereupon that, as a result of being executed by a computer, cause the computer to:
   receive, at a service provider network over a communication network, a request for a virtual machine, the service provider network having a set of server computers that can host virtual machines, the request specifying requirements for the virtual machine;
   analyze data regarding the set of server computers in the server provider network to determine a set of server computers that are currently able to satisfy the requirements specified by the request;
   run a server classification engine, by at least obtaining data from a data store to identify from the set of server computers one or more server computers with a high probability of successfully hosting the virtual machine, the server classification engine analyzing the data associated with similarities with previous requests for virtual machines, previously launched virtual machines classified as successful and unsuccessful, the states of the previously selected server computers at allocation, and the current operating states of the server computers in the set to perform the identification; and
   launch the virtual machine on an identified server computer to satisfy the request.

2. The computer readable storage medium of claim 1, having further computer-executable instructions sorted thereupon which, as a result of being executed by a computer, cause the computer to:
   classify the virtual machine launch on the identified server computer as successful; and
   update the inputs to the server classification engine using information indicating that the virtual machine launch on the identified server was classified as successful.

3. The computer readable storage medium of claim 2, wherein updating the inputs to the server classification engine comprises associating the request requirements, the operational state of the identified server computer at allocation, and the success determination.

4. The computer readable storage medium of claim 1, wherein launching the virtual machine comprises selecting between a number of identified servers.

5. The computer readable storage medium of claim 1, wherein using a classification engine to identify one or more server computers with a high probability of successfully hosting the virtual machine further comprises analyzing data regarding a requestor for computer resources and examining other allocations of computer resources on the set of server computers.

6. A computer-implemented method comprising:
   receiving, at a service provider, a request for a virtual machine instance;
   analyzing data in the request to determine a set of server computers able to fulfill requirements of the request;
   obtaining metric data from at least a data store about instances currently running on one or more server computers;
   identifying the one or more server computers in the set of server computers with a high probability of successfully running the instance by analyzing information about the requested instance and the metric data; and
   launching the instance on an identified server computer to satisfy the request.

7. The method of claim 6, wherein identifying a server computer in the set comprises running a server classification engine to identify one or more server computers likely to successfully run the instance from the set of server computers.

8. The method of claim 7, wherein the server classification engine uses Bayesian classification.

9. The method of claim 6, further comprising:
   determining whether the requested instance is running successfully on the identified server computer; and
   updating selection metrics regarding whether the instance is running successfully.

10. The method of claim 9, wherein updating the selection metrics comprises associating the request requirements, the operational state of the instance at allocation, and the success determination.

11. The method of claim 9, wherein determining whether the requested instance is running successfully comprises analyzing operational metrics of the identified server computer.

12. The method of claim 8, wherein running a server classification engine to identify one or more server computers likely to successfully run the instance further comprises analyzing data regarding the request, the current operational states for the server computers in the set, the states of the previously selected server computers at allocation, and the success of previous requests for computer resources on the previously selected server computers.

13. The method of claim 12, wherein the data regarding the request includes an identifier for the requestor and an identifier for the request.

14. The method of claim 6, wherein the request requirements include physical attributes for the instance.

15. The method of claim 14, wherein the physical attributes include the processing capability, memory capability, storage capability, and the networking capabilities for the instance.

16. The method of claim 6, wherein allocating the requested computer resources on an identified server computer comprises selecting one of the identified server computers that is a good fit for hosting the requested instance.

17. A system, comprising:
one or more processors; and
memory to store executable instructions that, if executed by the one or more processors, cause the system to:
determine whether a request for allocation of computer resources has been received at a service provider;
analyze data in the request to determine a set of server computers able to fulfill requirements of the request;
obtain metric data from at least a data store about instances currently running on the one or more server computers;
identify the one or more server computers in the set of server computers that are probabilistically likely to successfully provide the computer resources by analyzing information about the requested instance and the metric data; and
allocate the requested computer resources on an identified server computer to satisfy the request.

18. The system of claim 17, wherein identifying a server computer in the set comprises running a server classification engine to identify one or more server computers likely to successfully provide the computer resources from the set of server computers.

19. The system of claim 18, wherein the server classification engine uses Bayesian classification.

20. The system of claim 18, wherein the instructions further cause the system to:
determine whether the requested computer resources are running successfully on the allocated server computer; and
update selection metrics regarding whether the allocated server computer is running acceptably.

21. The system of claim 20, wherein updating selection metrics comprises associating the request requirements, the operational state of the allocated server computer at allocation, and the success determination.

22. The system of claim 20, wherein determining whether the requested computer resources are running successfully comprises analyzing operational metrics of the allocated server computer.

23. The system of claim 18, wherein running a server classification engine to identify one or more server computers likely to successfully provide the computer resources comprises analyzing data regarding the request, the current operational states for the server computers in the set, the states of the previously selected server computers at allocation, and the success of previous requests for computer resources on the previously selected server computers.

24. The system of claim 23, wherein the data regarding the request includes an identifier for the requestor and an identifier for the request.

25. The system of claim 17, wherein the request requirements include physical attributes for the computer resources.

26. The system of claim 17, wherein allocating the requested computer resources on an identified server computer comprises selecting one of the identified server computers.

* * * * *